United States Patent
Rausch (10) Patent No.: US 7,642,961 B1
(45) Date of Patent: Jan. 5, 2010

(54) REMOTE CONTROL ANTENNA POSITIONING SYSTEM

(75) Inventor: Walter F. Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 567 days.

(21) Appl. No.: 11/612,930

(22) Filed: Dec. 19, 2006

(51) Int. Cl.
*H04B 7/00* (2006.01)

(52) U.S. Cl. .................................... 342/367
(58) Field of Classification Search .............. 342/367
See application file for complete search history.

(56) References Cited

U.S. PATENT DOCUMENTS

| | | | | |
|---|---|---|---|---|
| 5,117,236 | A * | 5/1992 | Chang et al. | 342/367 |
| 6,011,973 | A * | 1/2000 | Valentine et al. | 455/456.6 |
| 6,188,883 | B1 * | 2/2001 | Takemura | 455/411 |
| 6,580,372 | B1 * | 6/2003 | Harris | 340/686.6 |
| 6,624,791 | B1 | 9/2003 | Rausch | |
| 6,816,115 | B1 * | 11/2004 | Redi et al. | 342/367 |
| 6,914,572 | B1 | 7/2005 | Rausch | |
| 6,996,419 | B1 | 2/2006 | Rausch | |
| 7,038,628 | B1 | 5/2006 | Rausch | |
| 7,123,940 | B1 | 10/2006 | Rausch et al. | |
| 7,216,363 | B2 * | 5/2007 | Serkowski et al. | 726/20 |
| 7,263,367 | B1 * | 8/2007 | Sabot | 455/456.1 |
| 2002/0077151 | A1 | 6/2002 | Matthews et al. | |
| 2004/0253951 | A1 | 12/2004 | Chang et al. | |
| 2005/0094585 | A1 | 5/2005 | Golden et al. | |
| 2006/0009262 | A1 | 1/2006 | Hamm | |

* cited by examiner

*Primary Examiner*—Gregory C Issing (57) ABSTRACT

An antenna positioning system comprises a first antenna system, a second antenna system, and a computer system. The computer system determines azimuths and elevations for the antenna systems to point at one another. The computer system retrieves license data for the antenna systems and determines if the antenna systems are licensed for the azimuths and elevations. If the antenna systems are licensed for the azimuths and elevations, then the computer system transfers control signals to the antenna systems indicating the azimuths and elevations. In response to the control signals, the antenna systems position themselves to the azimuths and elevations.

22 Claims, 11 Drawing Sheets

FIGURE 11

REMOTE CONTROL ANTENNA POSITIONING SYSTEM

BACKGROUND OF THE INVENTION

1. Field of the Invention

The invention is related to the field of communications, and in particular, to systems that remotely control the positioning of antenna systems.

2. Description of the Prior Art

Antennas exchange wireless communication signals over the air. Some antennas are point-to-point and must be positioned properly so they point at their target. Systems have been developed to remotely control the positioning of point-to-point antennas. Unfortunately, these remote positioning systems may not be effective for all types of antennas.

Microwave antennas have been used to communicate over the air between towers that are usually separated by a distance of 30-50 miles. These microwave antennas are rather large and cumbersome. Due to the nature of microwaves, the direction in which these microwave antennas are pointed is regulated through a government licensing scheme. Smaller microwave antennas with a smaller range have been proposed for use on cellular radio towers. There is no effective remote positioning system for these antennas given the strict regulatory environment for microwave transmissions.

SUMMARY OF THE INVENTION

Examples of the invention include antenna positioning systems and their methods of operation. Examples of the invention may also include antenna systems, computer systems, and software products for antenna positioning systems.

Some examples of the invention include a method of operating an antenna positioning system that comprises a first antenna system, a second antenna system, and a computer system. The computer system receives a selection of a first antenna system and a second antenna system. In response to the selection, the computer system determines a first directional azimuth for the first antenna system and a second directional azimuth for the second antenna system to point the first antenna system and the second antenna system at one another. The computer system retrieves license data for the first antenna system and the second antenna system and determines if the first antenna system is licensed for the first directional azimuth and if the second antenna system is licensed for the second directional azimuth. If the first antenna system is not licensed for the first directional azimuth, then the computer system indicates that the first antenna system is not licensed for the first directional azimuth, and if the second antenna system is not licensed for the second directional azimuth, then the computer system indicates that the second antenna system is not licensed for the second directional azimuth. If the first antenna system is licensed for the first directional azimuth and if the second antenna system is licensed for the second directional azimuth, then the computer system transfers a first control signal indicating the first directional azimuth and transfers a second control signal indicating the second directional azimuth. The first antenna system receives the first control signal, and in response, positions the first antenna system to the first directional azimuth. The second antenna system receives the second control signal, and in response, positions the second antenna system to the second directional azimuth.

In some examples of the invention, the first antenna system transfers a test signal. The second antenna system receives the test signal, determines signal strength for the received test signal, and transfers test data indicating the signal strength. The computer system receives the test data.

In some examples of the invention, the computer system determines additional directional azimuths for the first antenna system and transfers additional control signals to the first antenna system indicating the additional directional azimuths. The first antenna system receives the additional control signals, and in response, positions the first antenna system to the additional directional azimuths. The computer system determines one of the first directional azimuth and the additional directional azimuths that maximizes the signal strength of the received test signal. The first antenna system positions the first antenna system to the one of the directional azimuths that maximizes the signal strength of the received test signal.

In some examples of the invention, the computer system determines that the first antenna system is licensed for the additional directional azimuths.

In some examples of the invention, the computer system determines additional directional azimuths for the second antenna system and transfers additional control signals to the second antenna system indicating the additional directional azimuths. The second antenna system receives the additional control signals, and in response, positions the second antenna system to the additional directional azimuths. The computer system determines one of the first directional azimuth and the additional directional azimuths that maximizes the signal strength of the received test signal. The second antenna system positions the second antenna system to the one of the directional azimuths that maximizes the signal strength of the received test signal.

In some examples of the invention, the computer system determines that the second antenna system is licensed for the additional directional azimuths.

In some examples of the invention, the computer system, in response to the selection of the antenna systems, determines a first elevation angle for the first antenna system and a second elevation angle for the second antenna system to point the first antenna system and the second antenna system at one another. The computer system determines if the first antenna system is licensed for the first elevation angle and if the second antenna system is licensed for the second elevation angle. If the first antenna system is not licensed for the first elevation angle, then the computer system indicates that the first antenna system is not licensed for the first elevation angle, and if the second antenna system is not licensed for the second elevation angle, then the computer system indicates that the second antenna system is not licensed for the second elevation angle. If the first antenna system is licensed for the first elevation angle and if the second antenna system is licensed for the second elevation angle, then the computer system indicates the first elevation angle in the first control signal and indicates the second elevation angle in the second control signal. The first antenna system positions the first antenna system to the first elevation angle in response to the first control signal. The second antenna system positions the second antenna system to the second elevation angle in response to the second control signal.

In some examples of the invention, the computer system determines additional elevation angles for the first antenna system and transfers additional control signals to the first antenna system indicating the additional elevation angles. The first antenna system receives the additional control signals, and in response, positions the first antenna system to the additional elevation angles. The computer system determines one of the first elevation angle and the additional elevation angles that maximizes the signal strength of the received test signal. The first antenna system positions the first antenna system to the one of the elevation angles that maximizes the signal strength of the received test signal.

In some examples of the invention, the computer system determines that the first antenna system is licensed for the additional elevation angles.

In some examples of the invention, the computer system determines additional elevation angles for the second antenna system and transfers additional control signals to the second antenna system indicating the additional elevation angles. The second antenna system receives the additional control signals, and in response, positions the second antenna system to the additional elevation angles. The computer system determines one of the first elevation angle and the additional elevation angles that maximizes the signal strength of the received test signal. The second antenna system positions the second antenna system to the one of the elevation angles that maximizes the signal strength of the received test signal.

In some examples of the invention, the computer system determines that the second antenna system is licensed for the additional elevation angles.

In some examples of the invention, the first antenna system is mounted on a mounting structure, and the computer system verifies that the first elevation angle does not point the first antenna system back into the mounting structure.

In some examples of the invention, the second antenna system is mounted on a mounting structure, and the computer system verifies that the second elevation angle does not point the second antenna system back into the mounting structure.

In some examples of the invention, the first antenna system is mounted on a mounting structure, and the computer system verifies that the first directional azimuth does not point the first antenna system back into the mounting structure.

In some examples of the invention, the second antenna system is mounted on a mounting structure, and the computer system verifies that the second directional azimuth does not point the second antenna system back into the mounting structure.

In some examples of the invention, the first antenna system comprises a first microwave antenna and the second antenna system comprises a second microwave antenna.

In some examples of the invention, the first microwave antenna shares a radome with a Code Division Multiple Access (CDMA) antenna.

In some examples of the invention, the CDMA antenna exchanges user communications in wireless CDMA signals with user devices and the first microwave antenna exchanges the user communications in wireless microwave signals with the second microwave antenna.

In some examples of the invention, the first antenna system shares a radome with a Worldwide Interoperability Microwave Access (WIMAX) antenna.

In some examples of the invention, the WIMAX antenna exchanges user communications in wireless WIMAX signals with user devices and the first microwave antenna exchanges the user communications in wireless microwave signals with the second microwave antenna.

In some examples of the invention, the second antenna system comprises Customer Premise Equipment (CPE).

In some examples of the invention, the first antenna comprises a microwave patch antenna.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Antenna Positioning System

Figure 1:
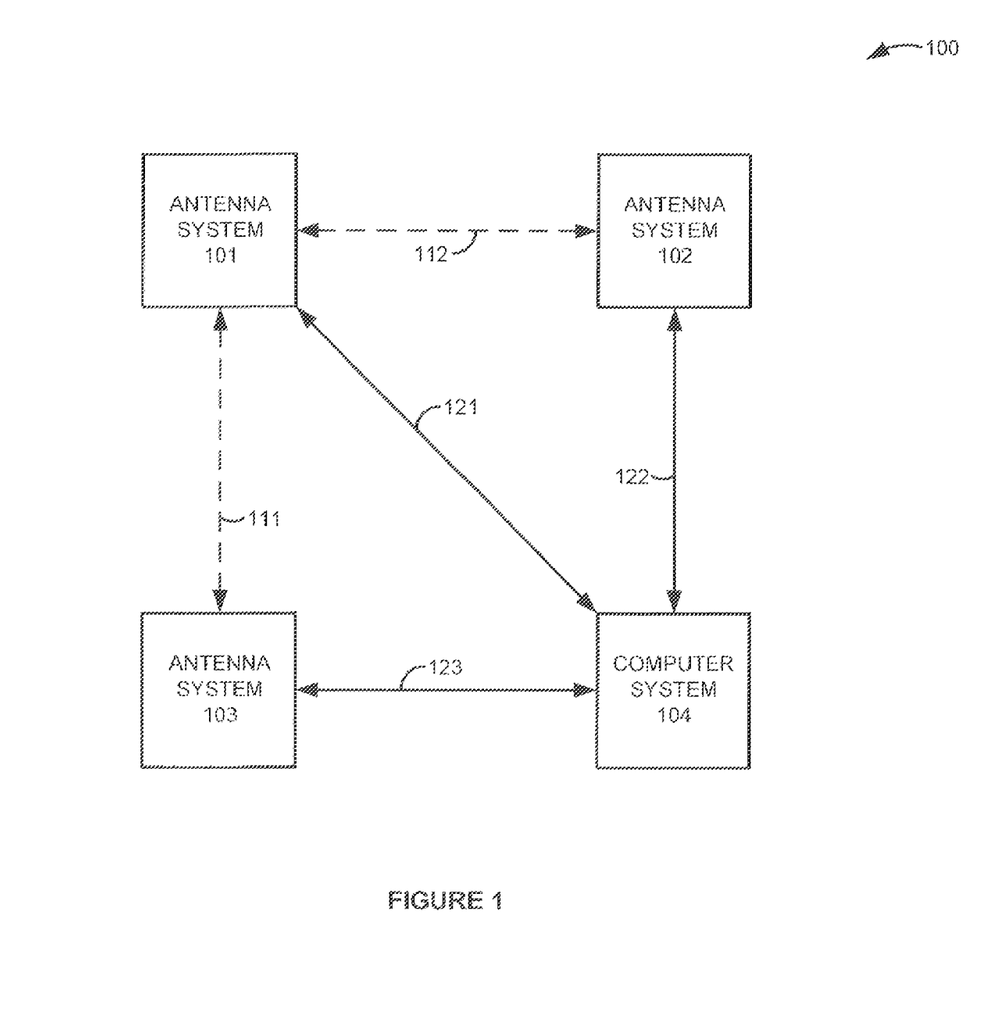
FIG. 1 illustrates an antenna positioning system in an example of the invention.

FIG. 1 illustrates antenna positioning system 100 in an example of the invention. Antenna positioning system 100 includes antenna systems 101-103 and computer system 104. The number of systems 101-104 has been restricted for clarity, and if desired, there could be more such systems in antenna positioning system 100. For example, there would typically be several more antenna systems that operate as described below. There could also be regional computer systems.

Antenna systems 101-103 exchange communications with other systems, which are omitted from FIG. 1 for clarity. In a first scenario, antenna system 101 exchanges these communications with antenna system 103 over wireless communication link 111. In a second scenario, antenna system 101 exchanges these communications with antenna system 102 over wireless communication link 112. Wireless communication links 111-112 are point-to-point wireless links that operate in the microwave spectrum from 1 Giga-Hertz (GHz) to 30 GHz. Microwave communication systems typically operate at one of the common carrier bands: 2, 4, 6, 10, 11, 18, 23, and 28 GHz. In alternative examples, point-to-point wireless links that operate in a different frequency spectrum could be used.

Antenna system 101 and computer system 104 communicate over communication link 121. Antenna system 102 and computer system 104 communicate over communication link 122. Antenna system 103 and computer system 104 communicate over communication link 123. Communication links 121-123 could use the air (wireless), metallic wires, optical fibers, or some other transport media. Communication links 121-123 could use Time Division Multiplex (TDM), Internet Protocol (IP), Ethernet, Synchronous Optical Network (SONET), Wave Division Multiplexing (WDM), or some other communication protocol—and various combinations of these communication protocols could be used. Communication links 121-123 may include multiple communication systems and media that are coupled together to form the links.

Since wireless links 111-112 are point-to-point, antenna systems 101 and 103 must be pointed at one another to communicate over wireless link 111. Likewise, antenna systems 101 and 102 must be pointed at one another to communicate over wireless link 112. Computer system 104 controls the directional azimuths and elevation angles that antenna systems 101-103 are pointed to. Computer system 104 also verifies that antenna systems 101-103 are licensed for the directional azimuths and elevation angles that they point to. Computer system 104 may also verify that antenna systems 101-103 do not point back into their own mounting structures.

In some examples, some of antenna systems 101-103 could be Customer Premise Equipment (CPE) located at a customer site. Thus, antenna systems 101-103 could be used to provide customer access to a large communication network. In other examples, antenna systems 101-103 could all be network systems. Thus, antenna systems 101-103 could be used to provide network backhaul, such as from wireless base stations to mobile switching systems or Internet access systems.

Figure 2:
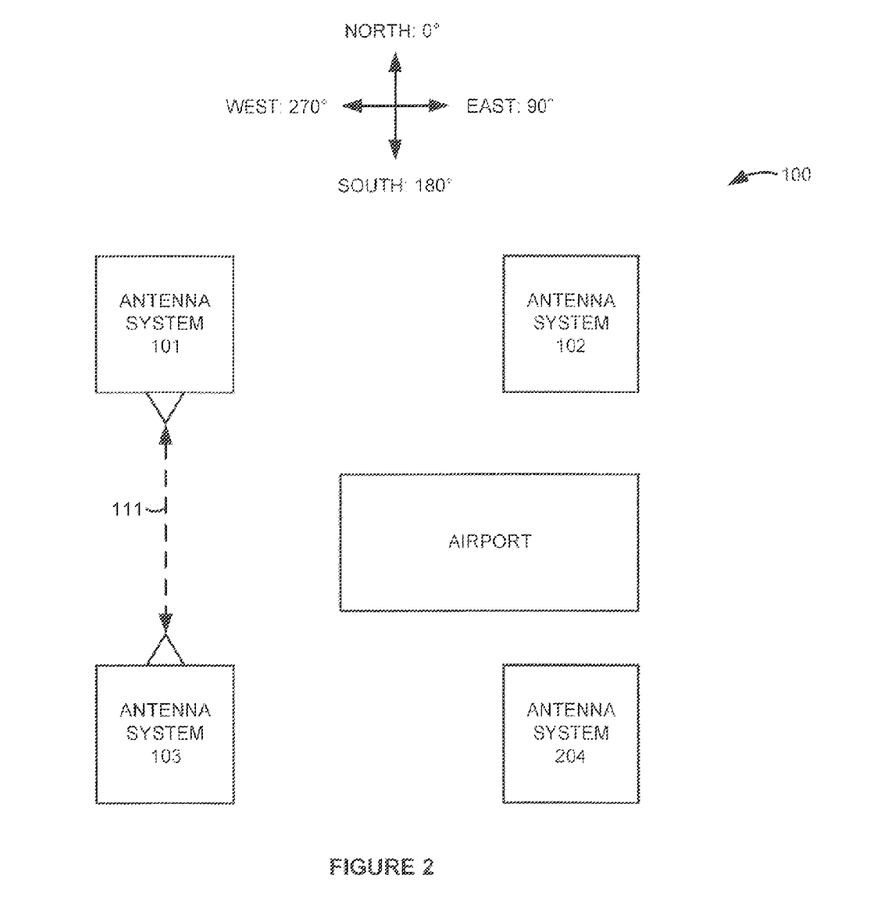
FIG. 2 illustrates an antenna positioning system in an example of the invention.

FIG. 2 illustrates antenna positioning system 100 in an example of the invention. Computer system 104 is omitted from FIG. 2 for clarity. In addition to antenna systems 101-103, FIG. 2 also shows an airport and antenna system 204. FIG. 2 shows a map view from above with directions indicated by a compass rose.

FIG. 2 shows the first scenario described above where antenna systems 101 and 103 communicate over wireless link 111. In the first scenario, antenna system 101 is pointed to a directional azimuth of 180° (south), and antenna system 103 is pointed to a directional azimuth of 0° (north).

Figure 3:
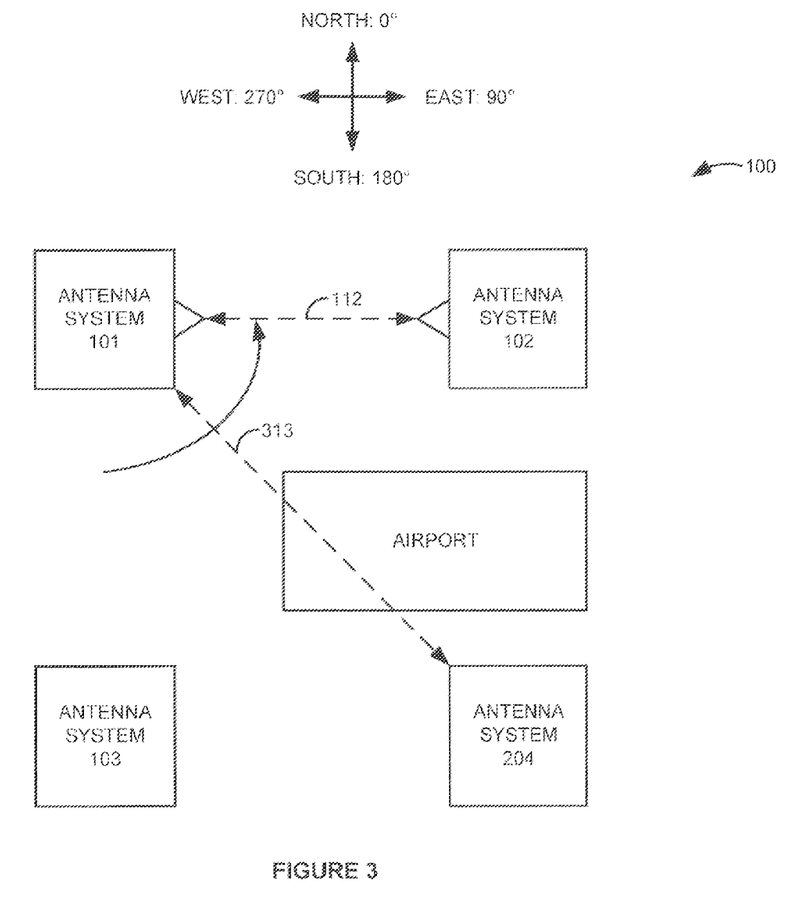
FIG. 3 illustrates an antenna positioning system in an example of the invention.

FIG. 3 illustrates antenna positioning system 100 in an example of the invention. Computer system 104 is omitted from FIG. 3 for clarity. FIG. 3 shows the airport and antenna systems 101-103 and 204. FIG. 3 shows a map view from above with directions indicated by the compass rose.

FIG. 3 shows the second scenario described above where antenna systems 101 and 102 communicate over wireless link 112. In the second scenario, antenna system 101 is pointed to a directional azimuth of 90° (east), and antenna system 102 is pointed to a directional azimuth of 270° (west). As indicated by the arrow on FIG. 3, antenna system 101 has repositioned itself from pointing at antenna system 103 (FIG. 2) to pointing at antenna system 102.

FIG. 3 shows a potential wireless communication link 313 in between antenna systems 101 and 204. Potential wireless communication link 313 would traverse the airspace over an airport. For this reason, antenna system 101 is not licensed to point to directional azimuths between 110° and 160° (southeast). Computer system 104 controls the re-positioning of antenna system 101 from pointing south at antenna system 103 to pointing east at antenna system 102, while also ensuring that that antenna system 101 does not point southeast (110°-160°) at the airport. If desired, antenna system 101 could be restricted from pointing back at its mounting structure. This restriction could be implemented in antenna system 101 or in computer system 104.

Figure 4:
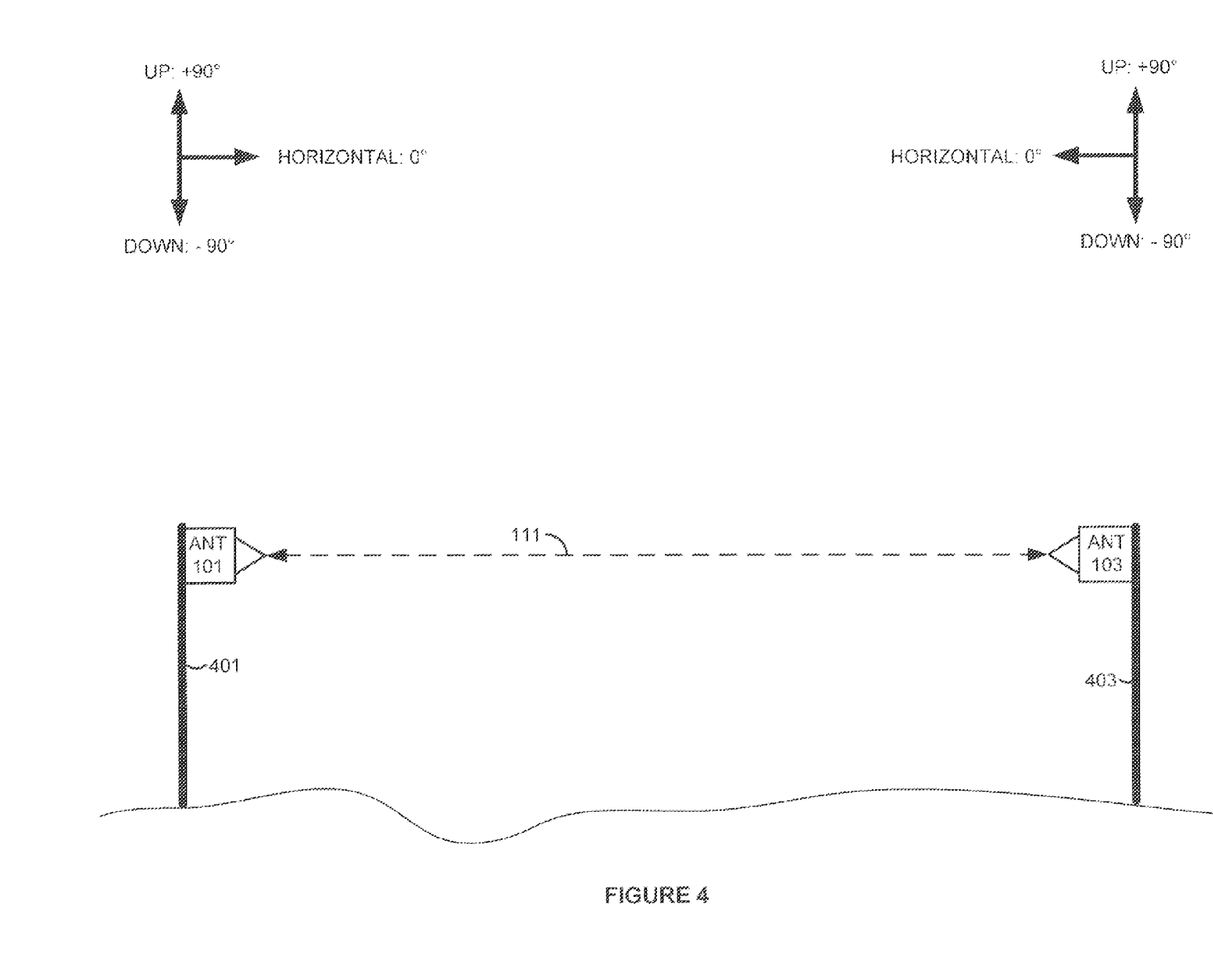
FIG. 4 illustrates an antenna positioning system in an example of the invention.

FIG. 4 illustrates antenna positioning system 100 in an example of the invention. Antenna system 102 and computer system 104 are omitted from FIG. 4 for clarity. In addition to antenna systems 101-103, FIG. 4 also shows towers 401 and 403 that elevate respective antenna systems 101 and 103. FIG. 4 shows an elevation view where elevation angles are indicated as: up is +90°, horizontal is 0°, and down is −90°. FIG. 4 shows the first scenario described above where antenna systems 101 and 103 communicate over wireless link 111. In the first scenario, antenna systems 101 and 103 are each pointed to an elevation angle of 0° (horizontal).

Figure 5:
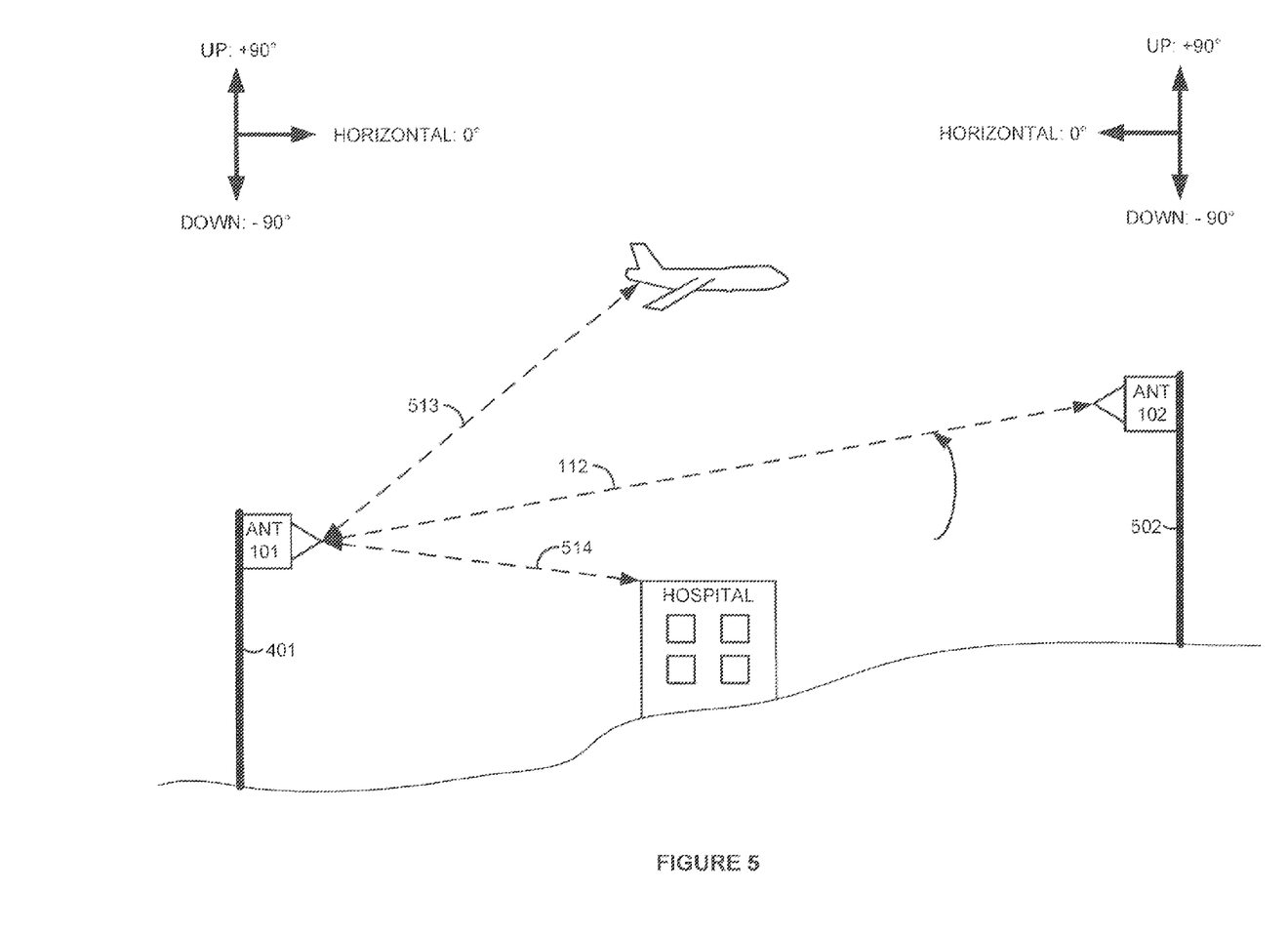
FIG. 5 illustrates an antenna positioning system in an example of the invention.

FIG. 5 illustrates antenna positioning system 100 in an example of the invention. Antenna system 103 and computer system 104 are omitted from FIG. 5 for clarity. FIG. 5 shows antenna systems 101-102, a hospital, and an airplane. In addition, FIG. 5 also shows towers 401 and 502 that elevate respective antenna systems 101 and 102. FIG. 5 shows an elevation view with elevation angles indicated as: up is +90°, horizontal is 0°, and down is −90°.

FIG. 5 shows the second scenario described above where antenna systems 101 and 102 communicate over wireless link 112. In the second scenario, antenna system 101 is pointed to an elevation angle of +20° (above the horizontal), and antenna system 102 is pointed to an elevation angle of −20° (below the horizontal). As indicated by the arrow on FIG. 5, antenna system 101 has repositioned itself from pointing at antenna system 103 (FIG. 4) to pointing at antenna system 102.

FIG. 5 shows a potential wireless communication link 513 in between antenna system 101 and an air traffic corridor represented by the airplane. Potential wireless communication link 513 would traverse the air traffic corridor. For this reason, antenna system 101 is not licensed to point to elevation angles greater than +30°. FIG. 5 also shows a potential wireless communication link 514 in between antenna system 101 and a hospital. Potential wireless communication link 514 would traverse the hospital. For this reason, antenna system 101 is not licensed to point to elevation angles less than −40°. Computer system 104 controls the re-positioning of antenna system 101 from pointing horizontally at antenna system 103 to pointing above the horizontal at antenna system 102, while also ensuring that that antenna system 101 points within the licensed elevation angles (from −40° to +30°).

Computer System

Figure 6:
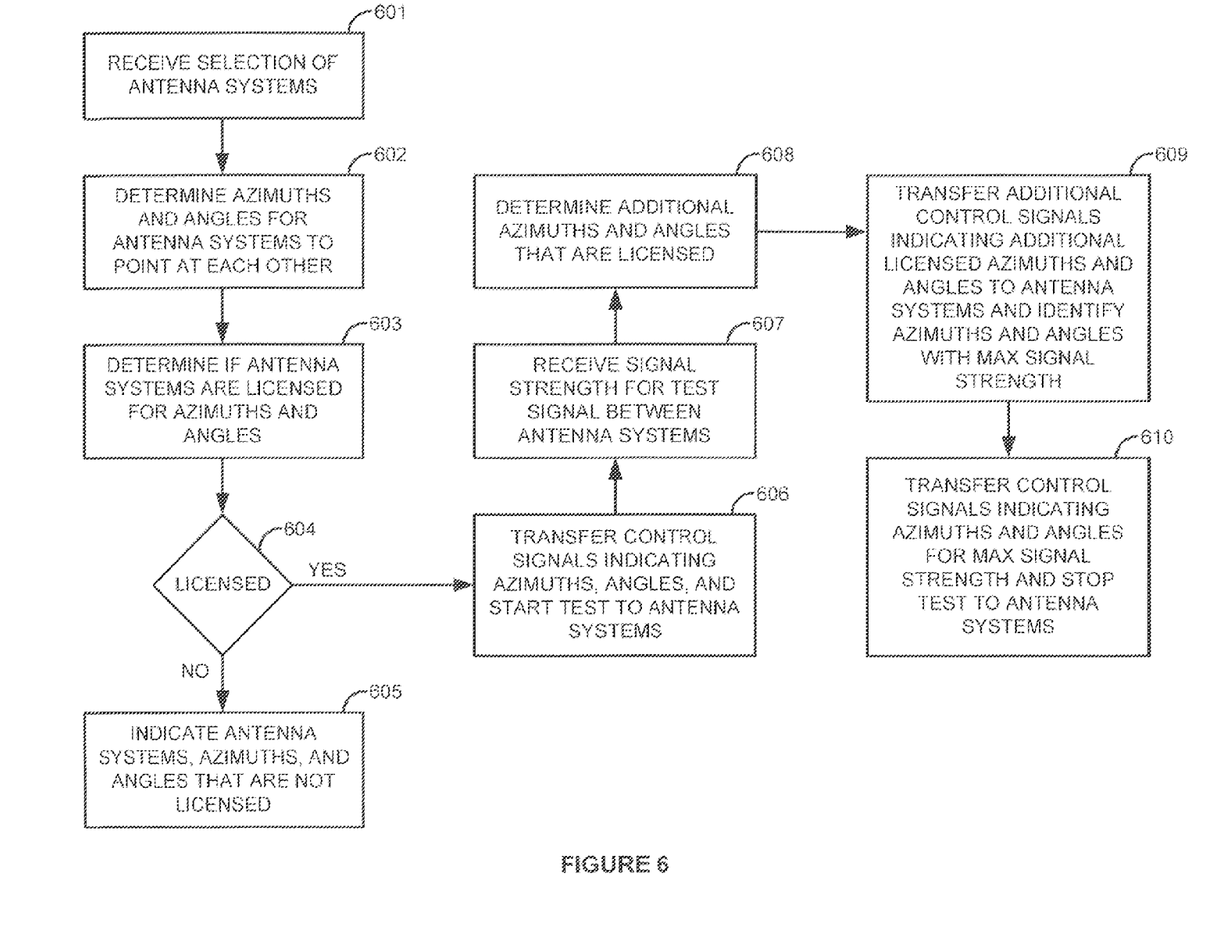
FIG. 6 illustrates a process for a computer system in an example of the invention.

FIG. 6 illustrates a process for computer system 104 in an example of the invention. The reference numbers on FIG. 6 are indicated parenthetically below. Computer system 104 receives a selection of antenna systems 101-102 (601). Typically, a user who operates computer system 104 would select antenna systems 101-102 through a user interface. For example, the user may select the antenna systems from a map display. Alternatively, the antenna systems could be selected by another computer system, such as a fault management system.

In response to the selection, computer system 104 determines a directional azimuth and elevation angle for antenna system 101 to point at antenna system 102 (602). Computer system 104 also determines a directional azimuth and elevation angle for antenna system 102 to point at antenna system 101 (602). Typically, computer system 104 stores three-dimensional location data (such as GPS coordinates) for antenna systems 101-102, and processes this data to determine the directional azimuths and elevation angles. Alternatively, the location data could be supplied along with the selection of the antenna systems—especially for new antenna systems.

Computer system 104 retrieves license data for antenna systems 101-102 and determines if antenna system 101 is licensed for its selected directional azimuth and elevation angle (603). Computer system 104 also determines if antenna system 102 is licensed for its selected directional azimuth and elevation angle (603). A license is a government permit for the antenna system to point at a directional azimuth and elevation angle. Typically, the license is agreed to between the government and the antenna system operator, and the license specifies the azimuths and angles that are permitted for the antenna system.

If antenna system 101 is not licensed for its selected directional azimuth or elevation angle (604), then computer system 104 indicates that antenna system 101 is not licensed for the selected directional azimuth or elevation angle (605). If antenna system 102 is not licensed for its selected directional azimuth or elevation angle (604), then computer system 104 indicates that antenna system 102 is not licensed for the selected directional azimuth or elevation angle (605). Typically, the indication is provided to the user through the user interface, such as a message on a display screen. Alternatively, computer system 104 may send the indication in a message to another system, such as a fault management system.

If antenna systems 101-102 are licensed for their selected directional azimuths and elevation angles (604), then computer system 104 transfers control signals indicating the selected directional azimuths and elevation angles to antenna systems 101-102 (606). The control signals also indicate that antenna systems 101-102 should transfer a test signal (606). In response to the control signals, antenna systems 101-102 reposition themselves to point to the directional azimuths and elevation angles indicated by the control signals.

Antenna system 101 then transfers a test signal to antenna system 102 over wireless link 112. Antenna system 102 receives the test signal, determines its signal strength, and reports the signal strength to computer system 104. Alternatively, antenna system 102 could transfer the test signal to antenna system 101 over wireless link 112, and antenna system 101 could receive the test signal, determine its signal strength, and report the signal strength to computer system 104. Computer system 104 receives the signal strength data (607).

Computer system 104 determines additional directional azimuths for antenna system 101 and verifies that antenna system 101 is licensed for the additional directional azimuths (608). Typically, the additional directional azimuths are only slightly different from and on each side of the initially selected directional azimuth for antenna system 101, so they should also be licensed. Computer system 104 transfers control signals to antenna system 101 indicating the additional directional azimuths that are licensed (609). In response, antenna system 101 positions itself to the additional directional azimuths. Computer system 104 compares the signal strength for each directional azimuth to identify the directional azimuth for antenna system 101 that has the maximum signal strength (609).

Computer system 104 determines additional directional azimuths for antenna system 102 and verifies that antenna system 102 is licensed for the additional directional azimuths (608). Typically, the additional directional azimuths are only slightly different from and on each side of the initially selected directional azimuth for antenna system 102, so they should also be licensed. Computer system 104 transfers control signals to antenna system 102 indicating the additional directional azimuths that are licensed (609). In response, antenna system 102 positions itself to the additional directional azimuths. Computer system 104 compares the signal strength for each directional azimuth to identify the directional azimuth for antenna system 102 that has the maximum signal strength (609).

Computer system 104 determines additional elevation angles for antenna system 101 and verifies that antenna system 101 is licensed for the additional elevation angles (608). Typically, the additional elevation angles are only slightly different from and on each side of the initially selected elevation angle for antenna system 101, so they should also be licensed. Computer system 104 transfers control signals to antenna system 101 indicating the additional elevation angles that are licensed (608). In response, antenna system 101 positions itself to the additional elevation angles. Computer system 104 compares the signal strength for each elevation angle to identify the elevation angle for antenna system 101 that has the maximum signal strength (609).

Computer system 104 determines additional elevation angles for antenna system 102 and verifies that antenna system 102 is licensed for the additional elevation angles (608). Typically, the additional elevation angles are only slightly different from and on each side of the initially selected elevation angle for antenna system 102, so they should also be licensed. Computer system 104 transfers control signals to antenna system 102 indicating the additional elevation angles that are licensed (609). In response, antenna system 102 positions itself to the additional elevation angles. Computer system 104 compares the signal strength for each elevation angle to identify the elevation angle for antenna system 102 that has the maximum signal strength (609).

The above sequence for assessing signal strength was: antenna 101 azimuth-antenna 102 azimuth-antenna 101 elevation-antenna 102 elevation. In alternative embodiments, the sequence could be rearranged or combined in a different manner to determine the azimuths and angles that have the maximum signal strength.

Computer system 104 transfers a control signal to antenna system 101 indicating the licensed directional azimuth and elevation angle that points to antenna system 102 with maximum signal strength (610). The control signal also includes a stop test instruction. Computer system 104 transfers a control signal to antenna system 102 indicating the licensed directional azimuth and elevation angle that points to antenna system 101 with maximum signal strength (610). The control signal also includes a stop test instruction. In response to the control signals, antenna systems 101-102 stop the test and position themselves for wireless link 112 to the licensed directional azimuths and elevation angles with maximum signal strength.

Although not shown on FIG. 6, computer system 104 may also verify that the selected directional azimuth or elevation angle does not point the antenna system back at the antenna system mounting structure. These restricted directional azimuths and elevation angles would be determined after antenna system mounting and would be provided to computer system 104. Computer system 104 would retrieve the restriction data and make the determination in process boxes 603-604 of FIG. 6. If there is a problem, computer system 104 would indicate that an antenna system points back into its mounting structure in process box 605 of FIG. 6. Computer system 104 could provide the indication through its user interface or communication interface in a similar manner to its indication of an unlicensed directional azimuth or elevation angle.

Although not shown on FIG. 6, computer system 104 may also provide an alarm if the strength of the test signal is below a specified threshold. This could include an additional signal strength test after the final positioning of the antenna system. Computer system 104 would indicate the signal strength alarm through its user interface or communication interface in a similar manner to its indication of an unlicensed directional azimuth.

Figure 7:
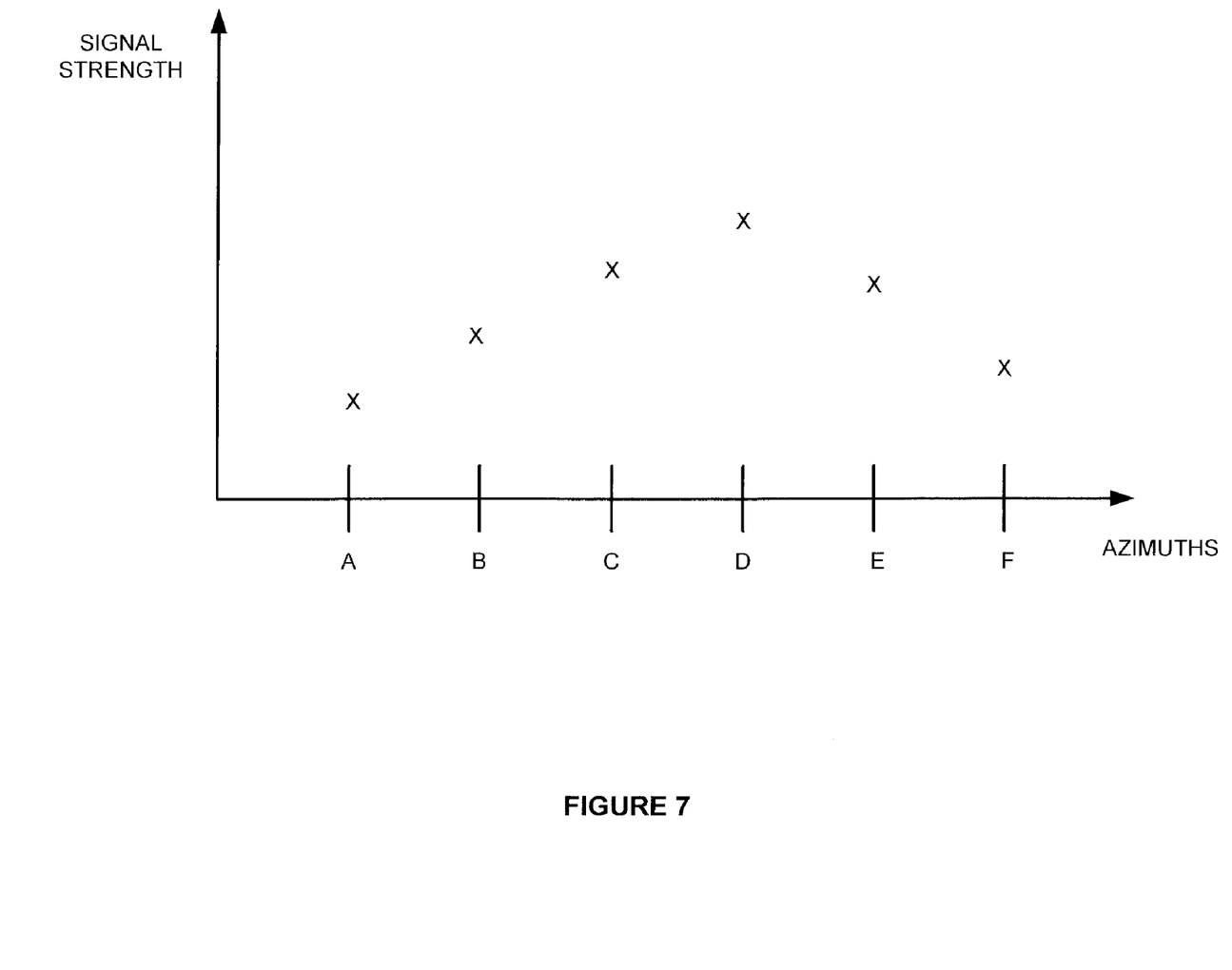
FIG. 7 illustrates a signal strength graph for directional azimuths in an example of the invention.

FIG. 7 illustrates a signal strength graph for directional azimuths in an example of the invention. The graph has signal strength as the vertical axis and directional azimuths as the horizontal axis. The initial directional azimuth is at position C. Additional azimuths A and B have lower signal strength than initial azimuth C. Additional azimuth D has higher signal strength than initial azimuth C, but additional azimuths E and F are lower than azimuth D. Azimuth D has the highest signal strength among azimuths A-F and has downward signal strength trends on each side. Thus, directional azimuth D has the maximum signal strength.

Figure 8:
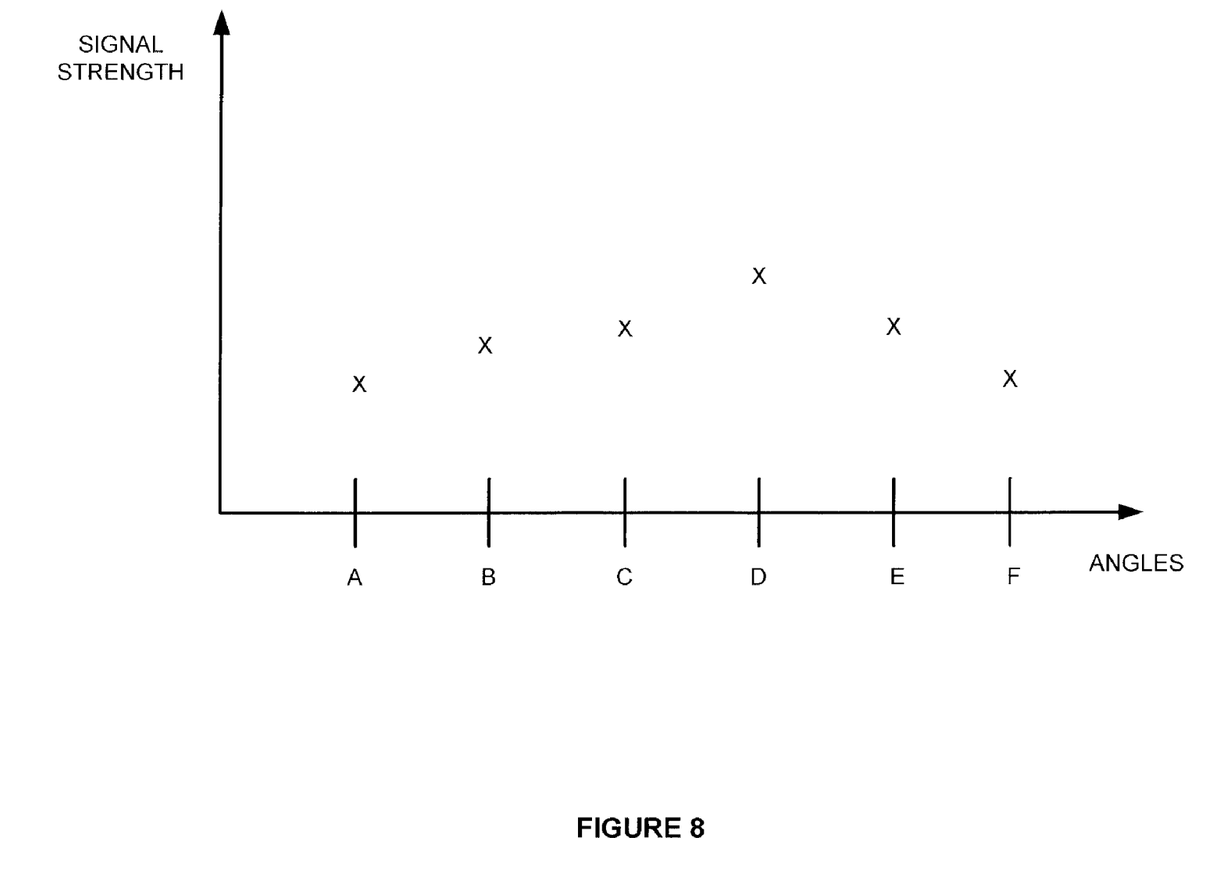
FIG. 8 illustrates a signal strength graph for elevation angles in an example of the invention.

FIG. 8 illustrates a signal strength graph for elevation angles in an example of the invention. The graph has signal strength as the vertical axis and elevation angles as the horizontal axis. The initial elevation angle is at position C. Additional angles A and B have lower signal strength than initial angle C. Additional angle D has higher signal strength than initial angle C, but additional angles E and F are lower than angle D. Angle D has the highest signal strength among angles A-F and has downward signal strength trends on each side. Thus, elevation angle D has the maximum signal strength Computer system 104 includes a communication interface, processing system, and user interface. The processing system includes a storage system that stores software. The processing system is linked to the communication interface and to the user interface. Computer system 104 could be comprised of a programmed general-purpose computer, although those skilled in the art will appreciate that programmable or special purpose circuitry and equipment may be used. Computer system 104 may be distributed among multiples devices.

The communication interface could comprise a network interface, modem, port, transceiver, or some other communication device. The communication interface may be distributed among multiple communication devices. The processing system could comprise a computer microprocessor, logic circuit, or some other processing device. The processing system may be distributed among multiple processing devices. The user interface could comprise a keyboard, mouse, voice recognition interface, microphone and speakers, graphical display, touch screen, or some other type of user device. The user interface may be distributed among multiple user devices. The storage system could comprise a disk, tape, integrated circuit, server, or some other memory device. The storage system may be distributed among multiple memory devices.

The processing system retrieves and executes the software from the storage system. The software may comprise an operating system, utilities, drivers, networking software, and other software typically loaded onto a general-purpose computer. The software could comprise an application program, firmware, or some other form of machine-readable processing instructions. When executed by the processing system, the software directs the processing system to operate computer system 104 as described herein.

Antenna Systems

Figure 9:
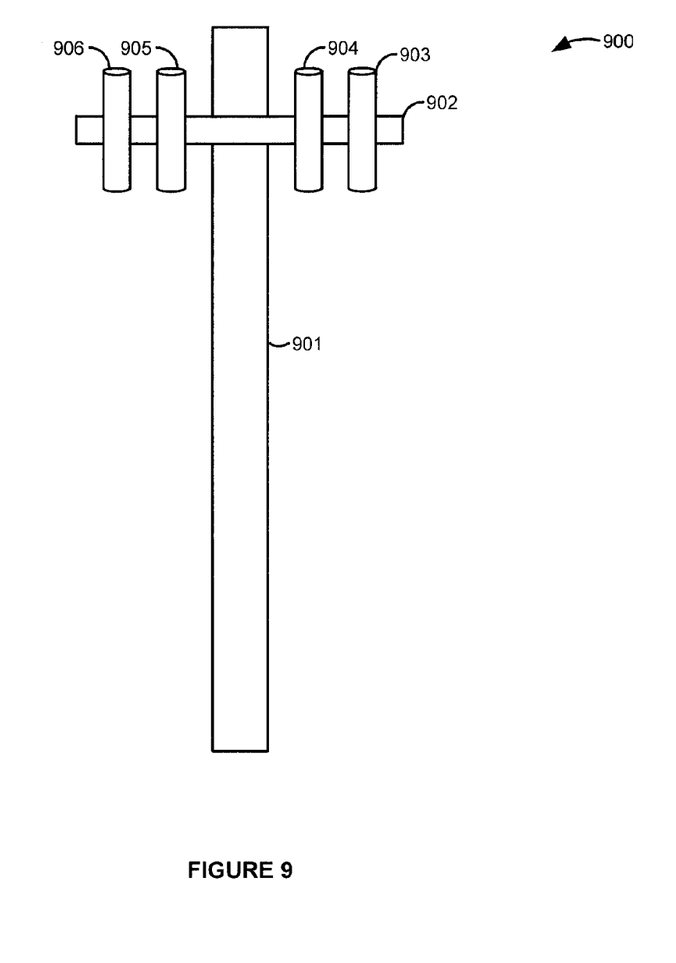
FIG. 9 illustrates an antenna system site in an example of the invention.

FIG. 9 illustrates antenna system site 900 in an example of the invention. Antenna system site 900 includes structure 901. Structure 901 could be a tower, building, or some other antenna mounting structure. Structure 901 includes radome mount 902. Radome mount 902 could be a cross-bar or some other radome mounting apparatus. Radomes 903-906 are mounted on radome mount 902. Radomes 903-906 provide environmental protection for internal antenna systems. Typically, the antenna systems each have power, communication, and data lines running from radomes 903-906 and down structure 901 to communications and power equipment on the ground. If desired, the control could be supplied over the existing coaxial cabling for the communications traffic by using lower frequencies (near DC) for control. DC supply power may be provided over the existing coaxial cabling through the use of the appropriate isolators, a technique familiar to those skilled in the art.

Radomes 903-906 include internal antenna systems. Note how each antenna system could be positioned to point back into the mounting structure that is comprised of structure 901, mount 902, and antenna systems in radomes 903-906. Also note that the azimuths that point the antenna systems back into the mounting structure are different for each radome.

Figure 10:
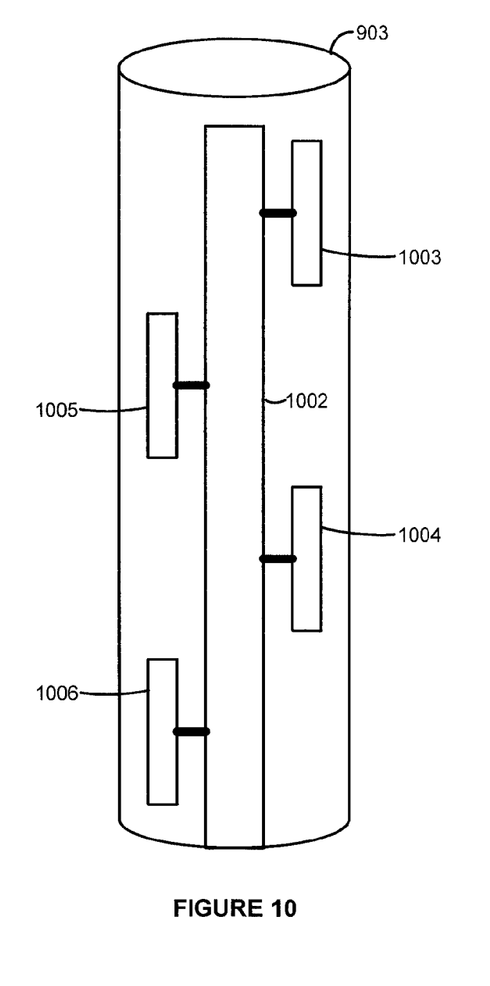
FIG. 10 illustrates a radome in an example of the invention.

FIG. 10 illustrates radome 903 in an example of the invention. Radome 903 includes antenna mount 1002. Antenna systems 1003-1006 are coupled to antenna mount 1002. In the preferred embodiment, at least one of antenna systems 1003-1006 is a directional microwave antenna. The other antenna systems could also be microwave antennas or they could be some other type of antenna. Note that mount 1002 is part of the mounting structure, and antenna systems 1003-1006 should be restricted from pointing back at mount 1002 as described above.

For example, antenna system 1003 could be a microwave antenna system and antenna system 1004 could be a Code Division Multiple Access (CDMA) antenna system. CDMA antenna system 1004 exchanges user communications in a wireless CDMA format with mobile user devices. CDMA antenna system 1004 exchanges the user communications through internal communication cabling and interface circuitry with microwave antenna system 1003. Microwave antenna system 1003 exchanges the user communications in a wireless microwave format with another microwave antenna system, and the other system exchanges the user communications with a mobile switching system.

In another example, antenna system 1003 could be a microwave antenna system and antenna system 1005 could be a Worldwide Interoperability Microwave Access (WIMAX) antenna system. WIMAX antenna system 1005 exchanges user communications in a wireless WIMAX format with mobile user devices. WIMAX antenna system 1005 exchanges the user communications through internal communication cabling and interface circuitry with microwave antenna system 1003. Microwave antenna system 1003 exchanges the user communications in a wireless microwave format with another microwave antenna system, and the other system exchanges the user communications with an Internet access system.

Figure 11:
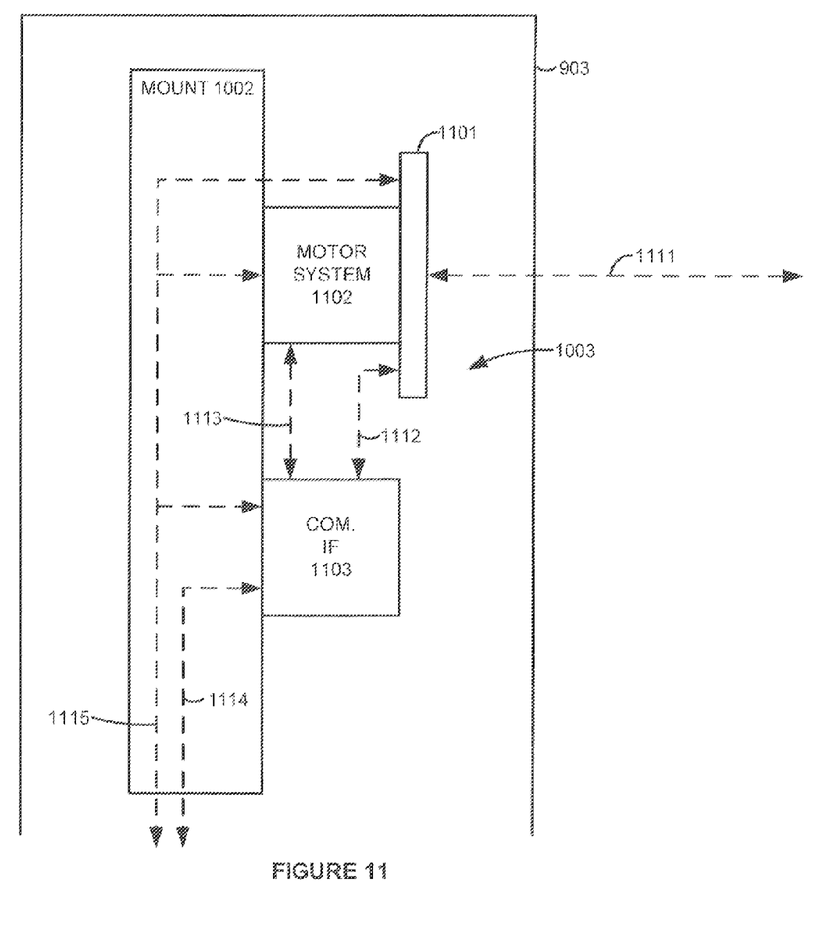
FIG. 11 illustrates an antenna system in an example of the invention.

FIG. 11 illustrates antenna system 1003 in an example of the invention. Antenna system 1003 includes antenna 1101, motor system 1102, and communication interface 1103. Antenna 1101 is mounted on motor system 1102. For example, antenna 1101 may be connected to motor system 1102 with a gimbal mounting. Motor system 1102 and communication interface 1103 are coupled to antenna system mount 1002. Radome 903 encloses the above components 1002 and 1101-1103. Power line 1115 is coupled to a power supply on the ground. Antenna 1101, motor system 1102, and communication interface 1103 receive power from power line 1115.

Antenna 1101 comprises a microwave patch antenna that is suitably sized to fit within radome 903 along with the other antenna systems. Motor system 1102 includes an elevation motor to position antenna 1101 to the selected elevation angle. Motor system 1102 includes an azimuth motor to position antenna 1101 to the selected directional azimuth. The elevation motor and the azimuth motor could be gear reduction motors. Motor system 1102 includes a motor controller to drive the elevation and azimuth motors in response to the control signals.

Communication interface 1103 includes ports and circuitry to interface link 1112 (antenna 1101) and link 1114 (ground systems). This circuitry converts the communications between an intermediate frequency for link 1114 and a microwave frequency for link 1112. Communication interface 1103 includes ports and circuitry to interface link 1113 (motor 1102) and link 1114 (ground systems). This circuitry processes control signals from link 1114 to initiate testing and control motor system 1102. Communication interface 1103 also includes circuitry to generate test signals for link 1112, determine the signal strength of received test signals from link 1112, and transfer corresponding reports to link 1114.

In operation, communication interface 1103 receives control signals from the antenna positioning computer system over communication link 1114 (which typically receives the signals over ground communication systems and links). Communication interface 1103 transfers motor control signals to motor system 1102 over communication link 1113. Motor system 1102 positions antenna 1101 to point at the directional azimuth and elevation angle indicated in the motor control signals.

In response to the control signals, communication interface 1103 transfers a test signal to antenna 1101 over communication link 1112. Antenna 1101 transfers the test signal over wireless microwave link 1111. Alternatively, Antenna 1101 may receive the test signal over wireless microwave link 1111 and transfer the test signal to communication interface 1103 over communication link 1112. Communication interface 1103 determines the signal strength of the received test signal and transfers signal strength reports over link 1114 to a ground system for delivery to the computer system.

In response to the control signals, motor system 1102 positions antenna 1101 to the directional azimuth and elevation angle having the maximum signal strength. Once positioned, antenna 1101 exchanges communications with another microwave antenna over wireless microwave link 1111. Antenna 1101 exchanges the communications with communications interface 1103 over communication link 1112. Communication interface 1103 exchanges the communications with a ground system over communication link 1114.

Small Form-Factor Microwave Antennas

In some embodiments, the above-described antenna positioning system can be used with point-to-point microwave antennas having a small form factor. The small form factor is used so the microwave antennas can fit within a conventional radome that is currently used for cellular telephone antennas. Advantageously, the placement of the microwave antennas is made far easier because the microwave antennas can share radomes with existing cellular systems or use radome mounting locations for existing cellular systems. The following discussion describes such a system, although other radomes and antenna systems could be used in other embodiments.

A Multi-link antenna array conserves the mounting space available on cell towers and minimizes antenna leasing expenses. An array of small antennas are mounted inside a radome enclosure. The size and shape of the radome enclosure matches the general size and shape of cellular antenna radomes. This enables the array of small antennas, known as a multi-link antenna array, to be mounted onto cell towers or building rooftops in a similar fashion as cellular radomes and conform to present cell antenna leasing agreements. By matching the size and shape of the cellular antenna element, the multi-link antenna array will also have essentially the same wind loading as the cellular antenna element.

The radome enclosure may be any suitable shape, such as cylinder, rectangle, or the like. The radome enclosure is configured to mount to the antenna mounting system of a cell tower or a building site using the same mounting system used by the cellular antenna elements. The radome enclosure is configured to resemble those used for cellular antenna elements. One typical cellular radome is a cylindrical tube with rounded ends. The cylindrical tube is typically 10 to 16 inches in diameter and typically 6 feet in length. The cylindrical tube is typically mounted with a vertical orientation. Another typical cellular radome is generally rectangular in shape. The generally rectangular shape may have rounded edges or chamfered edges. The generally rectangular shape is typically 10 to 14 inches in depth and width and approximately 6 feet in length.

The Multi-link antenna array has a width. The cellular antenna elements also have a width. The cellular antenna elements may have a minimum spacing between the cellular antenna elements. Typically, each element mounted onto the antenna element mounting deck is charged a leasing fee under present cell antenna leasing agreements. Cellular tower lease agreements may vary in the detail that describes the size and shape of a cellular antenna element that may be mounted onto a cellular tower under the lease agreement. The detail level may vary between one lease agreement that specifies the exact size and shape of the cellular antenna element, to a lease agreement that only specifies the physical distance between cellular antenna elements. The size and shape of a cellular antenna element may be specified indirectly in the lease agreement by specifying the operating wavelength band and the output power for the cellular antenna element. In one example, the multi-link antenna array is configured to fit within the maximum size and space allowed under a cellular tower leasing agreement for a cellular antenna element. The size and shape allowed may vary depending on the leasing agreement for each tower. The width of the multi-link antenna array may be limited to the width of a cellular antenna element. The width of the multi-link antenna array may be just smaller than the minimum spacing allowed between cellular antenna elements. At this size, two multi-link antenna arrays mounted side-by-side would almost touch. The width of the multi-link antenna array might be limited to two feet.

The antenna mounting system is a vertical post fixed inside the radome enclosure. The antennas are mounted along the vertical post. The vertical post allows the antennas to be aimed over the full 360 degree azimuth range. Other antenna mounting systems that allow the full 360 degree azimuth range are possible and include a series of horizontal slots built into the radome enclosure, where each antenna mounts to the radome using one or more slots, a series of stackable disks, where each disk contains one antenna and where the disks can be rotated on top of each other, or the like. The antenna mounting system may limit the aim of the antennas to a subset of the full 360 degree azimuth range.

The antennas are configured to operate at one of the common carrier bands, for example the 2, 4, 6, 10, 11, 18, 23, or 28 GHz band. When operating at one of the common carrier bands, the antennas may be small patch antennas. Using a small sized patch antenna that fits into the form factor of the radome enclosure may still allow an effective range of up to 10 miles for some of the common carrier bands. The small patch antennas handle all weather conditions without link path failures and operate through foliage albeit with some reduction in range when operating at the 2, 4, or 6 GHz frequencies. The higher frequency common carrier bands (10-28 GHz) may have a reduction in link distance and less tolerance for adverse weather conditions using the small patch antennas. Patch antennas are common for many microwave bands. Matching a patch antenna to a given wavelength band is well known in the arts.

The signal lines for each of the plurality of antennas mounted inside the radome enclosure are bundled into one cable that exits the radome. The cable may also include a power lead, a ground path, control lines or the like. Each of the antennas mounted inside the radome include a radio frequency (RF) head. The RF head converts an intermediate frequency (IF) into the actual frequency used by the antenna. In this way an IF signal can be sent up the tower and into the radome enclosure, instead of the RF signal. The signal lines used to transmit IF signals are typically smaller than lines designed to carry microwave RF signals. By bundling all the signal lines, and possibly the power line, ground path, and control lines into only one cable, the cost under the current cellular lease agreements may be minimized.

All the antennas inside a radome enclosure may be similar and would operate at essentially the same wavelength. Alternatively, a variety of different antennas, operating over a wide range of frequencies, would be mounted inside one radome enclosure. The variety of antenna types include: small patch type antennas, yagi antennas, parabolic antennas, circular polarizing elements, and the like. The multi-link antenna array may operate at one of, or a combination of, the following carrier bands: common carrier bands of 4, 6, 10, 11, 18, 23, 28 GHz; unlicensed bands ISM 2.4, UNII 5.8, 3.6 GHz; E-band 71-91 GHz and auctioned carrier bands applicable with PTP (point to point) radio's: 700, 800, 1900 MHz, broadband radio service (BRS) 2.5 GHz and all LMDS bands (28 GHz through 39 GHz), Millimeter Wave radio bands, or any frequency where point-to-point microwave and millimeter wave radios are authorized to operate. One or more multi-link antenna arrays may be mounted onto a cellular tower, depending on the number of point-to-point links required at that site. The RF modems per link maybe also be incorporated into each antenna to improve signal-to-noise margin and further increase link ranges.

The multi-link antenna array enables multiple point-to-point links to be supported from a single enclosure on a cell tower antenna mounting system or building mounting system. The small sized antennas permit the use of existing common carrier bands as cell site backhaul links. The common enclosure holding multiple antennas avoids the high leasing costs associated with mounting individual antennas. The individual antenna rotary mounting provides support of multiple microwave paths having full azimuth range of microwave link propagation from a single host array and tower mounting.

The invention claimed is:

1. A method of operating an antenna positioning system, the method comprising:
    in a computer system, receiving a selection of a first antenna system and a second antenna system, and in response, determining a first directional azimuth for the first antenna system and a second directional azimuth for the second antenna system to point the first antenna system and the second antenna system at one another;
    in the computer system, retrieving license data for the first antenna system and the second antenna system and determining if the first antenna system is licensed for the first directional azimuth and if the second antenna system is licensed for the second directional azimuth;
    in the computer system, if the first antenna system is not licensed for the first directional azimuth, then indicating that the first antenna system is not licensed for the first directional azimuth, and if the second antenna system is not licensed for the second directional azimuth, then indicating that the second antenna system is not licensed for the second directional azimuth;
    in the computer system, if the first antenna system is licensed for the first directional azimuth and if the second antenna system is licensed for the second directional azimuth, then transferring a first control signal indicating the first directional azimuth and transferring a second control signal indicating the second directional azimuth;
    in the first antenna system, receiving the first control signal, and in response, positioning the first antenna system to the first directional azimuth; and
    in the second antenna system, receiving the second control signal, and in response, positioning the second antenna system to the second directional azimuth.

2. The method of claim 1 further comprising:
    transferring a test signal from the first antenna system;
    receiving the test signal in the second antenna system, determining signal strength for the received test signal, and transferring test data indicating the signal strength; and
    receiving the test data in the computer system.

3. The method of claim 2 further comprising:
    in the computer system, determining additional directional azimuths for the first antenna system and transferring additional control signals to the first antenna system indicating the additional directional azimuths;
    in the first antenna system, receiving the additional control signals, and in response, positioning the first antenna system to the additional directional azimuths; and
    in the computer system, determining one of the first directional azimuth and the additional directional azimuths that maximizes the signal strength of the received test signal; and
    in the first antenna system, positioning the first antenna system to the one of the directional azimuths that maximizes the signal strength of the received test signal.

4. The method of claim 3 further comprising, in the computer system, determining that the first antenna system is licensed for the additional directional azimuths.

5. The method of claim 2 further comprising:
    in the computer system, determining additional directional azimuths for the second antenna system and transferring additional control signals to the second antenna system indicating the additional directional azimuths;
    in the second antenna system, receiving the additional control signals, and in response, positioning the second antenna system to the additional directional azimuths; and
    in the computer system, determining one of the first directional azimuth and the additional directional azimuths that maximizes the signal strength of the received test signal; and
    in the second antenna system, positioning the second antenna system to the one of the directional azimuths that maximizes the signal strength of the received test signal.

6. The method of claim 5 further comprising, in the computer system, determining that the second antenna system is licensed for the additional directional azimuths.

7. The method of claim 2 further comprising:
in the computer system, in response to the selection, determining a first elevation angle for the first antenna system and a second elevation angle for the second antenna system to point the first antenna system and the second antenna system at one another;
in the computer system, determining if the first antenna system is licensed for the first elevation angle and if the second antenna system is licensed for the second elevation angle;
in the computer system, if the first antenna system is not licensed for the first elevation angle, then indicating that the first antenna system is not licensed for the first elevation angle, and if the second antenna system is not licensed for the second elevation angle, then indicating that the second antenna system is not licensed for the second elevation angle;
in the computer system, if the first antenna system is licensed for the first elevation angle and if the second antenna system is licensed for the second elevation angle, indicating the first elevation angle in the first control signal and indicating the second elevation angle in the second control signal;
in the first antenna system, positioning the first antenna system to the first elevation angle in response to the first control signal; and
in the second antenna system, positioning the second antenna system to the second elevation angle in response to the second control signal.

8. The method of claim 7 further comprising:
in the computer system, determining additional elevation angles for the first antenna system and transferring additional control signals to the first antenna system indicating the additional elevation angles;
in the first antenna system, receiving the additional control signals, and in response, positioning the first antenna system to the additional elevation angles; and
in the computer system, determining one of the first elevation angle and the additional elevation angles that maximizes the signal strength of the received test signal; and
in the first antenna system, positioning the first antenna system to the one of the elevation angles that maximizes the signal strength of the received test signal.

9. The method of claim 8 further comprising, in the computer system, determining that the first antenna system is licensed for the additional elevation angles.

10. The method of claim 7 further comprising:
in the computer system, determining additional elevation angles for the second antenna system and transferring additional control signals to the second antenna system indicating the additional elevation angles;
in the second antenna system, receiving the additional control signals, and in response, positioning the second antenna system to the additional elevation angles; and
in the computer system, determining one of the first elevation angle and the additional elevation angles that maximizes the signal strength of the received test signal; and
in the second antenna system, positioning the second antenna system to the one of the elevation angles that maximizes the signal strength of the received test signal.

11. The method of claim 10 further comprising, in the computer system, determining that the second antenna system is licensed for the additional elevation angles.

12. The method of claim 7 wherein the first antenna system is mounted on a mounting structure, and further comprising in the computer system, verifying that the first elevation angle does not point the first antenna system back into the mounting structure.

13. The method of claim 7 wherein the second antenna system is mounted on a mounting structure, and further comprising in the computer system, verifying that the second elevation angle does not point the second antenna system back into the mounting structure.

14. The method of claim 1 wherein the first antenna system is mounted on a mounting structure, and further comprising in the computer system, verifying that the first directional azimuth does not point the first antenna system back into the mounting structure.

15. The method of claim 1 wherein the second antenna system is mounted on a mounting structure, and further comprising in the computer system, verifying that the second directional azimuth does not point the second antenna system back into the mounting structure.

16. The method of claim 1 wherein the first antenna system comprises a first microwave antenna and the second antenna system comprises a second microwave antenna.

17. The method of claim 1 wherein the first microwave antenna shares a radome with a Code Division Multiple Access (CDMA) antenna.

18. The method of claim 17 further comprising exchanging user communications in wireless CDMA signals between user devices and the CDMA antenna and exchanging the user communications in wireless microwave signals between the first microwave antenna and the second microwave antenna.

19. The method of claim 1 wherein the first antenna system shares a radome with a Worldwide Interoperability Microwave Access (WIMAX) antenna.

20. The method of claim 19 further comprising exchanging user communications in wireless GSM signals between user devices and the WIMAX antenna and exchanging the user communications in wireless microwave signals between the first microwave antenna and the second microwave antenna.

21. The method of claim 1 wherein the second antenna system comprises Customer Premise Equipment (CPE).

22. The method of claim 1 wherein the first antenna comprises a microwave patch antenna.

* * * * *